Figure 1:
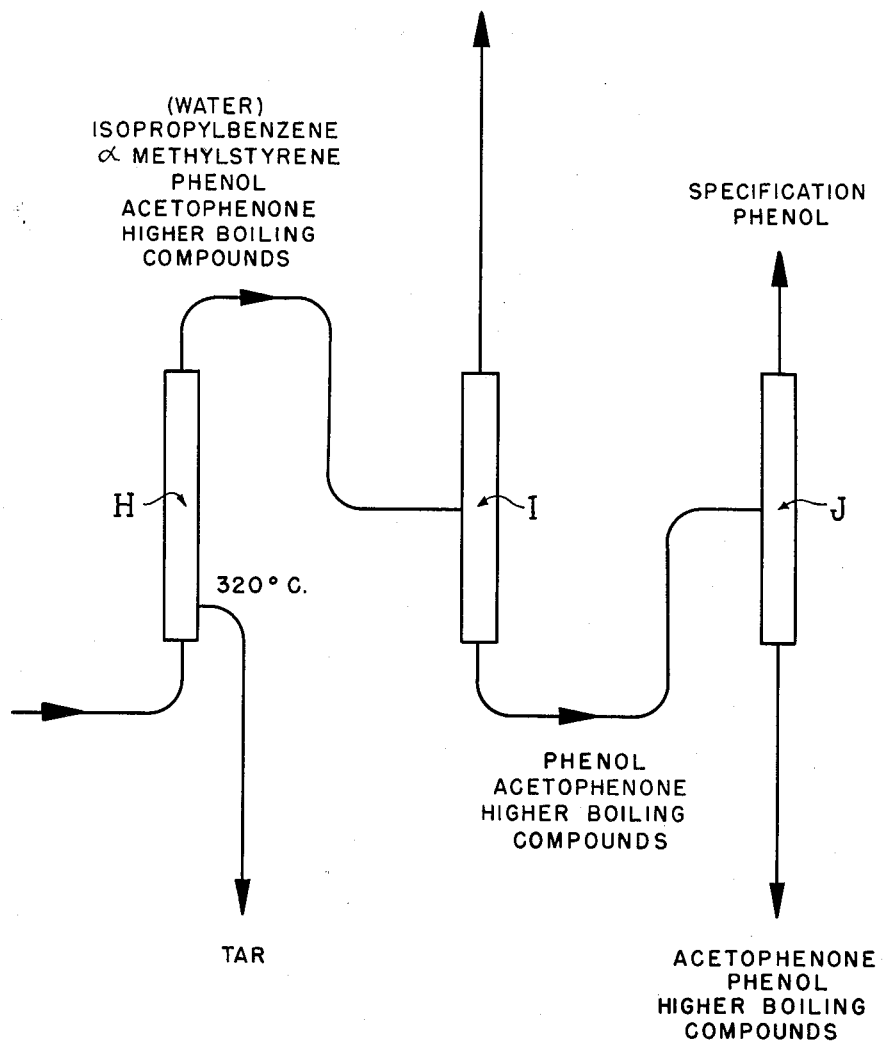

Dec. 27, 1955   G. P. ARMSTRONG ET AL   2,728,793
RECOVERY OF PHENOL
Filed July 17, 1952                          2 Sheets-Sheet 1

INVENTORS
GODFREY PAUL ARMSTRONG
THOMAS BEWLEY
MAURICE DUDLEY COOKE
BY Ernest G. Peterson

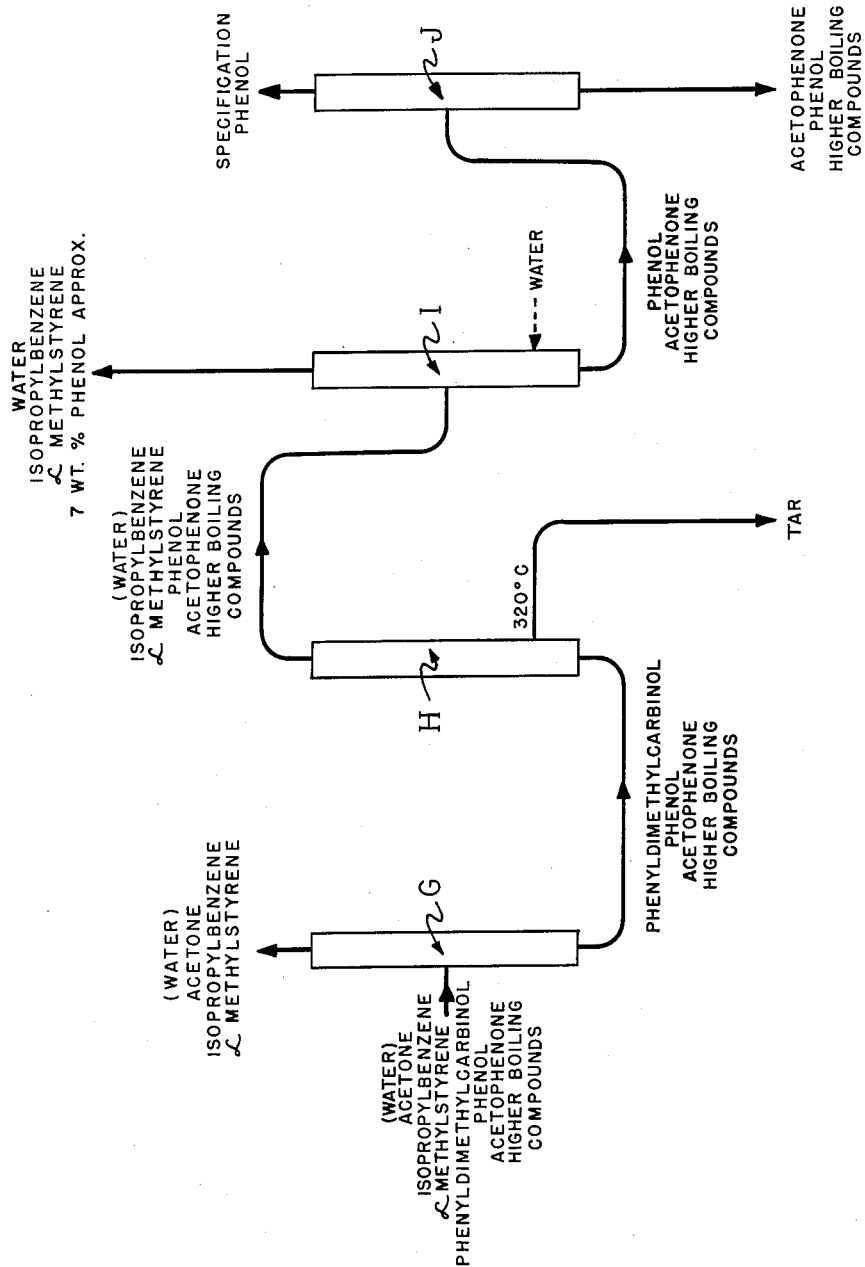

United States Patent Office 2,728,793
Patented Dec. 27, 1955

2,728,793

RECOVERY OF PHENOL

Godfrey Paul Armstrong, Kingswood, and Thomas Bewley and Maurice Dudley Cooke, Epsom, England, assignors, by mesne assignments, to Hercules Powder Company, a corporation of Delaware Application July 17, 1952, Serial No. 299,463

Claims priority, application Great Britain July 18, 1951

9 Claims. (Cl. 260—621)

The present invention refers to a process for the recovery of phenol and relates in particlular to the recovery of phenol in a pure state from reaction mixtures derived from the decomposition of isopropylbenzene hydroperoxide by means of decomposition catalysts. The expression "hydroperoxide" in the following is meant to include the peroxide as well.

It has been found that when isopropylbenzene hydroperoxide is decomposed by means of catalytically acting decomposition agents such as acids, for instance, sulfuric acid, phosphoric acid, toluene sulfonic acid and acetic acid, furthermore acid-treated earths, hydrogen ion exchange materials, ferric chloride, phosphorus pentachloride, aluminum chloride and similar acidic compounds, the decomposition reaction mixture contains, besides phenol and acetone which are the main products, acetophenone, α-methylstyrene, phenyldimethyl carbinol and cumylphenol. When the decomposition reaction is carried out with an oxidation reaction mixture which contains unreacted isopropylbenzene, the resulting decomposition reaction mixture contains, in addition, isopropylbenzene. The components of the said decomposition mixture are preferably recovered therefrom by fractional distillation when as first distillate acetone is recovered. On continuing the distillation any unreacted isopropylbenzene, if present in the decomposition mixture, together with water and α-methylstyrene are distilled over as the next fractions. After complete removal of the monomeric α-methylstyrene initially present, a mixture of phenol, acetophenone, phenyldimethyl carbinol, cumylphenol and some resinous matter formed by polymerization of methylstyrene remains in the still. When this mixture is distilled in order to recover therefrom the phenol, it has been found that although the distillation is effected under very exacting fractionating conditions, the collected distilled phenol fraction is not sufficiently free from impurities to make it to fulfill the requirements laid down by the British Standard Specification 523/38 regarding solubility in water, as on dilution with water there results a turbid solution, nor does it fulfill the requirements of the U. S. P. 13 Specification. Detailed investigations have shown that this turbidity of the aqueous phenol solution is due to the presence in the collected distilled phenol fraction of small amounts of hydrocarbons, mainly α-methylstyrene, and that as little as 260 parts per million are sufficient to furnish the objectionable turbidity. As α-methylstyrene boils at a considerably lower temperature than phenol and as the α-methylstyrene initially present in the decomposition reaction mixture had been completely separated as shown by analysis, the presence of further quantities in the final phenol was at first inexplicable.

The present invention is based on the discovery that the further quantities of α-methylstyrene found in the phenol after that initially present in the decomposition mixture has been removed completely are formed subsequently during the distillation by dehydration of the phenyldimethyl carbinol which is present in the decomposition mixture. Unexpectedly, the dehydration of the phenyldimethyl carbinol takes place only very gradually during the distillation. It has been found that dehydration of the carbinol in the particular mixture being distilled is quite dependent on the temperature to which the phenyldimethyl carbinol is subjected, and that the dehydration increases with a rise in the temperature, which of course gradually occurs as the distillation proceeds. With these higher temperatures, however, the tendency of the α-methylstyrene to polymerize also increases. In addition, the use of higher temperatures promotes the condensation of phenol with α-methylstyrene and with acetophenone also present in the reaction mixture. All these condensation reactions caused by the application of higher temperatures result in loss of phenol and other valuable compounds. Attempts to catalyze the dehydration of the phenyldimethyl carbinol, for instance by the addition of acid such as sulfuric acid to the still content were not satisfactory since the acid tended to promote the polymerization of the α-methylstyrene formed again and to promote condensation of the α-methylstyrene with phenol to form cumylphenol with consequent loss of valuable material.

It is an object of the present invention to recover pure phenol from the isopropylbenzene hydroperoxide decomposition mixture. By pure phenol is meant a product which will satisfy either the requirements of the U. S. P. 13 Specification or British Standard Specification 523/38.

It is another object of the invention to recover from the decomposition mixture monomeric α-methylstyrene in as high a yield as possible since α-methylstyrene itself is a valuable material. It may furthermore be hydrogenated to furnish isopropylbenzene which may then be recycled to the oxidation process and thus serve as starting material for the production of additional quantities of isopropylbenzene hydroperoxide whereby the economy of the whole process of phenol production is favored.

It is an additional object of the invention to obtain the aforementioned results in a very simple manner by which the formation of by-products and thereby loss of valuable material is minimized.

The process for the recovery of pure phenol by fractional distillation from phenol-containing mixtures derived from the catalytic decomposition of isopropylbenzene hydroperoxide accordingly comprises removing the phenyldimethyl carbinol from said phenol-containing mixture before separating pure phenol by fractional distillation. It is preferred to separate the decomposition mixture from the catalyst and acetone before the removal of phenyldimethyl carbinol. The removal of phenyldimethyl carbinol is effected by decomposing the phenyldimethyl carbinol in the decomposition mixture.

The requirements regarding the desired purity of the phenol vary in the different countries and accordingly the amounts of phenyldimethyl carbinol which, after removal of the bulk of the carbinol, may be tolerated in the phenol-containing mixture differ. Thus for instance when the production of a B. S. S. grade phenol is desired such an amount of undecomposed phenyldimethyl carbinol is permissible as will result in the production by dehydration during the fractionation of the phenol-containing mixture of not more than 0.04% by weight of α-methylstyrene calculated on the amount of phenol. Generally speaking an amount of 0.09% by weight of phenyldimethyl carbinol based on the amount of phenol in the phenol-containing mixture to be fractionated will result ultimately in the recovery of B. S. S. grade phenol and an amount of 0.15% by weight of phenyldimethyl carbinol based on the amount of phenol will result in the recovery of a U. S. P. grade phenol.

The removal of phenyldimethyl carbinol from the phenol-containing mixture according to the present invention comprises subjecting the decomposition mixture, preferably after previous removal of the decomposition catalyst and of the acetone, to a heat treatment at temperatures sufficiently high to produce substantially complete dehydration of the phenyldimethyl carbinol. The duration of the heat treatment should not be so long, however, as to polymerize to any large extent any α-methylstyrene initially present in the mixture. Actually, in order to minimize the polymerization of α-methylstyrene it is preferred to distill off the α-methylstyrene from the decomposition mixture before the mixture is subjected to the heat treatment. Any isopropylbenzene present may also be removed from the mixture before it is subjected to the heat treatment. The heat treatment may be carried out by a flash distillation at a temperature of for instance 300° C., whereby the mixture undergoes heat treatment for a very few seconds only. Another way of achieving the dehydration satisfactorily is to introduce the phenyldimethyl carbinol containing mixture into a column, the lower part of which is heated to the dehydration temperature, for instance at 300 to 350° C. The phenyldimethyl carbinol containing mixture also may be introduced into and preferably below the surface of liquid still residues which were left behind by previous operations and which are kept at temperatures between 300° and 400° C. When working in a continuous manner, an amount of these still residues corresponding to the quantity of high boiling substances remaining undistilled may be withdrawn from the still, either intermittently or continuously to maintain a substantially constant volume of the still residues in the cracking device. In general, the heat treatment is carried out at temperatures exceeding 300°, and preferably between 300 and 400°, since the cumylphenol also present is cracked at the same time into α-methylstyrene and phenol. The dehydration of the phenyldimethyl carbinol and the decomposition of the cumylphenol may be improved if a small amount of acid, for instance, 0.1% sulfuric acid, is present in the heating zone. The acid may be added to the heating zone, where it is renewed when operating continuously by continuous or intermittent addition, or it may be added with the feed.

Upon completion of the pyrolysis treatment the resulting mixture will contain phenol, α-methylstyrene and acetophenone. Some isopropylbenzene also may be present, either from the original decomposition reaction mixture or through formation during the heat treatment. The phenol contained in the resulting mixture may then be separated readily from the α-methylstyrene by fractional distillation and may be recovered in a pure state and substantially free from hydrocarbons. During the distillation the first fraction will be composed of any isopropylbenzene present together with any water, and the next fraction is α-methylstyrene. Phenol then is distilled over as the third fraction. Near the end of the distillation of the phenol fraction, the acetophenone present will form an azeotropic mixture with the phenol, but such a mixture may be separated by extraction, for instance with aqueous sodium hydroxide solution. From the aqueous phenol solution the phenol may be liberated in the well known manner, for instance by acidification. The fractional distillation may be carried out at ordinary pressure, but is preferably effected under diminished pressure.

As an alternative distillation procedure, the mixture resulting from the heat treatment may be subjected to distillation in the presence of water to separate the hydrocarbons from the phenol. For example, the mixture may be subjected to steam distillation, which can be adjusted in such a way that only isopropylbenzene and α-methylstyrene with only a small amount of phenol are distilled over. The residual material, containing most of the phenol, then may be fractionally distilled to separate the phenol and acetophenone.

The following example with the attached diagrammatic drawings illustrate the manner in which the process of the invention may be carried out in practice. The parts indicated are parts by weight. The procedure of the example is illustrated in Figure 1. An alternative procedure is shown in Figure 2. The latter procedure differs from that illustrated in Figure 1 in that acetone, α-methylstyrene and any isopropylbenzene are distilled off in column G before subjecting the remaining material to heat treatment in column H. Also, Figure 2 shows the modification of introducing water into column I during distillation of the heat treated mixture to remove hydrocarbons.

*Example 1*

A decomposition mixture from which catalyst and acetone had been removed contained besides isopropylbenzene, α-methylstyrene, acetophenone and higher boiling compounds, 2774 parts of phenol and 138 parts of phenyldimethyl carbinol. This mixture was fed to the base of column H in Figure 1, which contained liquid residues from previous operations maintained at 320° C. The distillate from column H was free from phenyldimethyl carbinol and consisted of water, isopropylbenzene, α-methylstyrene, phenol, acetophenone and a small amount of higher boiling compounds. This was fed to column I where substantially all the water, isopropylbenzene and α-methylstyrene was removed as a distillate with a small amount of phenol. The bottom product, containing most of the phenol, acetophenone and a small amount of high boiling compounds, was fed to column J, where 2679 parts of specification phenol was obtained as distillate.

What we claim and desire to protect by Letters Patent is:

1. A process for the recovery of pure phenol from a mixture obtained through acidic catalytic decomposition of isopropylbenzene hydroperoxide and containing all of the phenol resulting from said decomposition, which comprises subjecting said mixture to heat treatment at a temperature between 300° and 400° C. and subsequently fractionally distilling the heat-treated mixture to separate pure phenol.

2. A process for the recovery of pure phenol from a mixture obtained through acidic catalytic decomposition of isopropylbenzene hydroperoxide and containing all of the phenol resulting from said decomposition, which comprises removing the acidic catalyst from said mixture and subjecting the catalyst-free mixture to heat treatment at a temperature between 300° and 400° C. and subsequently fractionally distilling the heat-treated mixture to separate pure phenol.

3. A process for the recovery of pure phenol from a mixture obtained through acidic catalytic decomposition of isopropylbenzene hydroperoxide and containing acetone, α-methylstyrene, all of the phenol resulting from said decomposition, acetophenone, phenyldimethyl carbinol and cumyl phenol, which comprises removing acetone from said mixture by distillation and subjecting the acetone-free mixture to heat treatment at a temperature between 300° and 400° C. and subsequently fractionally distilling the heat-treated mixture to separate pure phenol.

4. A process for the recovery of pure phenol from a mixture obtained through acidic catalytic decomposition of isopropylbenzene hydroperoxide and containing acetone, α-methylstyrene, all of the phenol resulting from said decomposition, acetophenone, phenyldimethyl carbinol and cumyl phenol, which comprises removing acetone and α-methylstyrene from said mixture by distillation and subjecting the acetone- and α-methylstyrene-free mixture to heat treatment at a temperature between 300° and 400° C. and subsequently fractionally distilling the heat-treated mixture to separate pure phenol.

5. A process for the recovery of pure phenol from a mixture obtained through acidic catalytic decomposition of isopropylbenzene hydroperoxide and containing acetone, α-methylstyrene, all of the phenol resulting from said decomposition, acetophenone, phenyldimethyl carbinol and cumyl phenol, which comprises removing acetone and α-methylstyrene from said mixture by distillation, subjecting the acetone- and α-methylstyrene-free mixture to heat treatment at a temperature between 300° and 400° C., and subsequently fractionally distilling the heat-treated mixture containing α-methylstyrene, phenol and acetophenone to separate pure phenol.

6. A process for the recovery of pure phenol from a mixture obtained through acidic catalytic decomposition of isopropylbenzene hydroperoxide and containing acetone, α-methylstyrene, all of the phenol resulting from said decomposition, acetophenone, phenyldimethyl carbinol and cumyl phenol, which comprises removing acetone and α-methylstyrene from said mixture by distillation, subjecting the acetone- and α-methylstyrene-free mixture to heat treatment at a temperature between 300° and 400° C., distilling the heat-treated mixture containing α-methylstyrene, phenol and acetophenone in the presence of water to remove the α-methylstyrene, and fractionally distilling the residual material containing phenol and acetophenone to separate pure phenol.

7. A process for the recovery of pure phenol from a mixture obtained through acidic catalytic decomposition of isopropylbenzene hydroperoxide and containing acetone, α-methylstyrene, all of the phenol resulting from said decomposition, acetophenone, phenyldimethyl carbinol and cumyl phenol, which comprises removing acetone and α-methylstyrene from said mixture by distillation, introducing the acetone- and α-methylstyrene-free mixture into liquid still residues from previous operations at a temperature between 300° and 400° C., collecting a distillate containing α-methylstyrene, phenol and acetophenone, and fractionally distilling said distillate to separate pure phenol.

8. A process for the recovery of pure phenol from a mixture obtained through acidic catalytic decomposition of isopropylbenzene hydroperoxide and containing acetone, isopropylbenzene, α-methylstyrene, all of the phenol resulting from said decomposition, acetophenone, phenyldimethyl carbinol and cumyl phenol, which comprises removing acetone, isopropylbenzene and α-methylstyrene from said mixture by distillation, subjecting the acetone-, isopropylbenzene-, and α-methylstyrene-free mixture to heat treatment at a temperature between 300° and 400° C., and subsequently fractionally distilling the heat-treated mixture containing α-methylstyrene, phenol and acetophenone to separate pure phenol.

9. A process for the recovery of pure phenol from a mixture obtained through acidic catalytic decomposition of isopropylbenzene hydroperoxide and containing acetone, isopropylbenzene, α-methylstyrene, all of the phenol resulting from said decomposition, acetophenone, phenyldimethyl carbinol and cumyl phenol, which comprises removing acetone, isopropylbenzene, and α-methylstyrene from said mixture by distillation, introducing the acetone-, isopropylbenzene-, and α-methylstyrene-free mixture into liquid still residues from previous operations at a temperature between 300° and 400° C., collecting a distillate containing α-methylstyrene, phenol and acetophenone, and fractionally distilling said distillate to separate pure phenol.

References Cited in the file of this patent
UNITED STATES PATENTS

| | | |
|---|---|---|
| 2,345,625 | Palmer et al. | Apr. 4, 1944 |

FOREIGN PATENTS

| | | |
|---|---|---|
| 496,061 | Belgium | June 15, 1950 |
| 670,444 | Great Britain | Apr. 16, 1952 |